United States Patent Office 3,379,755
Patented Apr. 23, 1968

3,379,755
PREPARATION OF (4-ALKANOYLPHENOXY)
ACETIC ACIDS BY OXIDATION
Everett M. Schultz, Ambler, and Norman P. Gould, Lansdale, Pa., assignors to Merck & Co., Inc., Rahway, N.J.,
a corporation of New Jersey
No Drawing. Filed June 4, 1964, Ser. No. 373,134
4 Claims. (Cl. 260—523)

This invention relates to the oxidation of (4-alkanoyl) allyloxybenzene compounds to produce their corresponding (4-alkanoylphenoxy)alkanoic acid products. Pharmacological studies have shown that the said products are good diuretics which are useful in the treatment of conditions resulting from an excessively high concentration of electrolyte or fluid within the body as, for example, in the treatment of conditions resulting from congestive heart failure.

In general, the process of the invention comprises the oxidation of a (4-alkanoyl)allyloxybenzene, depicted infra as compound I, to produce the corresponding (4-alkanoylphenoxy)acetic acid product (IA). The following equation illustrates the reaction:

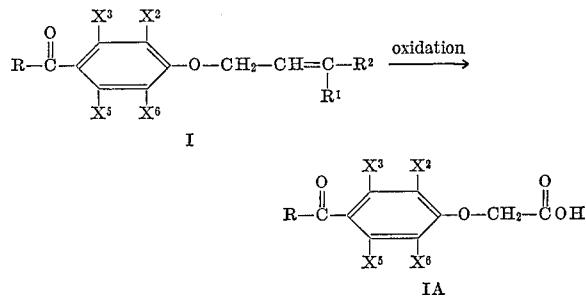

wherein the radical R is a member selected from the group consisting of hydrogen, lower alkyl, e.g., methyl, ethyl, propyl, isopropyl, butyl, isobutyl, etc., halo-lower alkyl such as trifluoromethyl-lower alkyl, e.g., 2,2,2-trifluoroethyl, 2,2,2-trifluoroisopropyl, etc., cycloalkyl such as cycloalkyl containing 3–6 nuclear carbon atoms, e.g., cyclopropyl, cyclopentyl, cyclohexyl, etc., aryl, e.g.,

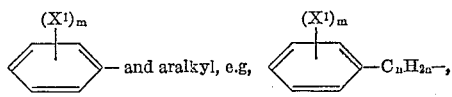

wherein $X^1$, in each occurrence, is a member selected from the group consisting of hydrogen, halogen, lower alkyl and lower alkoxy, $m$, in each occurrence, represents an integer having a value of 1–5 and $n$ represents an integer having a value of 1–4; $R^1$ and $R^2$ each represents similar or dissimilar radicals selected from the group consisting of hydrogen, lower alkyl, e.g., methyl, ethyl, etc., and mononuclear aryl, e.g., phenyl, p-tolyl, etc.; and each of the $X^2$, $X^3$, $X^5$ and $X^6$ radicals represents similar or dissimilar radicals selected from the group consisting of hydrogen, halogen, e.g., chlorine, fluorine, etc., lower alkyl, e.g., methyl, ethyl, etc., trihalomethyl, e.g., trifluoromethyl, etc., lower alkoxy, e.g., methoxy, ethoxy, etc., and, taken together, two X radicals substituted on adjacent carbon atoms of the benzene ring may be joined to form a 1,3-butadienylene linkage (i.e.,

—CH=CH—CH=CH—)

In general, any reagent capable of oxidizing the allyl group to carboxyl in the 4-alkanoylphenyl allyl ether reactant (I, supra) may be employed as the oxidizing agent in the process. Suitable reagents include, for example, potassium permanganate, chromium trioxide (i.e., chromic acid or chromic anhydride), sodium chromate, sodium dichromate, potassium dichromate, etc. However, we have found that oxidation of the 4-alkanoylphenyl allyl ether compound (I, supra) proceeds most advantageously in the presence of potassium permanganate, potassium dichromate and chromium trioxide, and these oxidizing agents represent the reagents of choice in the instant process.

The instant oxidation reaction may be conducted in any solvent in which the reactants are reasonably soluble and in which they are inert or undergo only minimal side reactions with the reactants of the process. Acetone is a particularly suitable solvent in which to conduct the reaction although one skilled in the art will readily recognize that any one of a wide variety of organic solvents may also be employed.

The (4-alkanoylphenoxy)alkanoic acid products produced by the process of the invention are generally obtained as crystalline solids and, if desired, may be purified by recrystallization from a suitable solvent. Suitable solvents include, for example, benzene, cyclohexane, methylcyclohexane, ligroin, ethyl ether, butyl chloride, carbon tetrachloride, hexane, ethanol, water, methanol and acetic acid or mixtures thereof.

The (4-alkanoyl)allyloxybenzene reactants of the process are conveniently prepared by the reaction of an alkali metal salt of a 4-halophenol (IV, infra) with an appropriate allyl halide, followed by the reaction of the thus formed 4-halophenyl allyl ether intermediate (III, infra) with magnesium metal in an ether solution; the Grignard reagent thus produced is then treated with a suitable aldehyde (i.e., R—CHO, wherein the R is as defined above) and the resulting 4-(1-hydroxyalkyl)phenyl allyl ether compound thus obtained (II, infra) is oxidized to produce the desired 4-alkanoylphenyl allyl ether (I). The reagents described supra as suitable for oxidation of the 4-alkanoylphenyl allyl ether compound (I) to the desired carboxylic acid (IA) may also be employed in the instant oxidation step; preferably, however, we choose to oxidize the 4-(1-hydroxyalkyl)phenyl allyl ether compound (II) by conducting the oxidation reaction in the presence of chromium trioxide or sodium chromate. The following equations illustrate this method of preparation:

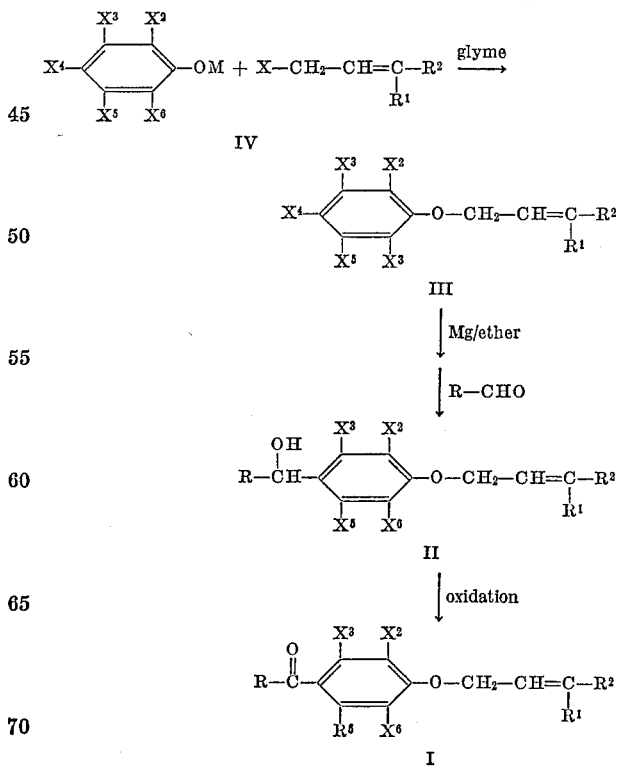

wherein the radicals, R, $R^1$, $R^2$, $X^2$, $X^3$, $X^5$ and $X^6$ are as defined above, X represents halogen, e.g., chlorine, bromine, etc.; $X^4$ represents halogen, e.g., bromine, etc.; and M represents the cation of an alkali metal hydroxide, e.g., a sodium or potassium cation. The alkali metal phenolate compound, described above as compound IV, is prepared from the corresponding phenol by the condensation of the latter with an alkali metal hydroxide dissolved in methanol.

The above-described synthesis, i.e., the method which comprises the Grignard reaction of a 4-halophenyl allyl ether (III) with magnesium and ether and then with an aldehyde (i.e., R—CHO) followed by the oxidation of the 4-(1-hydroxyalkyl)allyloxybenzene compound thus formed (II) to produce the corresponding alkanoyl derivative (I), constitutes a most advantageous route for the preparation of the 4-alkanoylphenyl allyl ether reactants (I) and also represents an object of this invention. This route has proved to be a most advantageous method for the preparation of the trifluoromethyl substituted derivatives of 4-alkanoylphenyl allyl ether inasmuch as attempts to prepare those oxo compounds through their 4-(1-hydroxyalkyl)allyloxybenzene intermediates by other methods have met with little or no success; however, it should be understood that the process is not limited to the preparation of the trifluoromethyl-4-alkanoylphenyl allyl ethers but is in fact a most suitable method for preparing all of the halo, lower alkyl, lower alkoxy and 1,3-butadienylene derivatives of 4-(1-hydroxyalkyl)allyloxybenzene (II) and their corresponding oxo counterparts (I).

We have also found that, under suitably controlled conditions, oxidation of the 4-(1-hydroxyalkyl)phenyl allyl ether intermediate (II) as, for example, with potassium permanganate, produces a [4-(1-hydroxyalkyl)-phenoxy]acetic acid derivative (IIA, infra) in lieu of the 4-alkanoylphenyl allyl ether compound (I) described above and this derivative may be oxidized to the desired (4-alkanoylphenoxy)acetic acid product (IA). The following equation illustrates this alternate method of preparation:

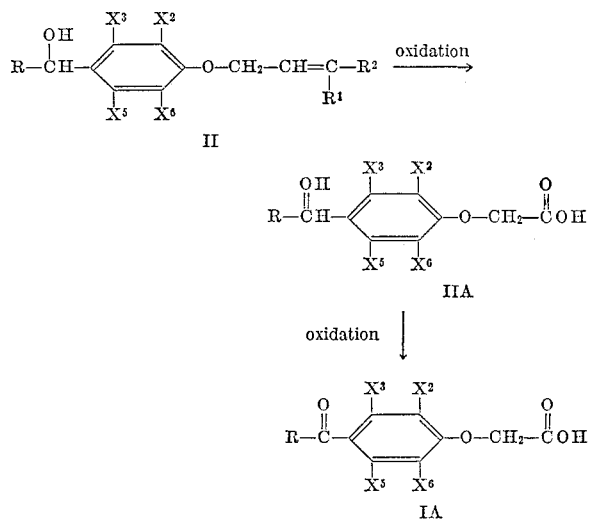

wherein the radicals R, $R^1$, $R^2$, $X^2$, $X^3$, $X^5$ and $X^6$ are as defined above. Oxidation of the [4-(1-hydroxyalkyl)-phenoxy]acetic acid intermediate (IIA) to the corresponding alkanoyl substituted product (IA) proceeds most advantageously in the presence of chromium trioxide but any of the oxidizing agents described above might also be used in the process with good results.

A preferred aspect of the invention relates to the oxidation of a 4-alkanoylphenyl allyl ether compound optionally substituted on the 2- and 3-carbon atoms of the benzene nucleus. The following equation illustrates this process:

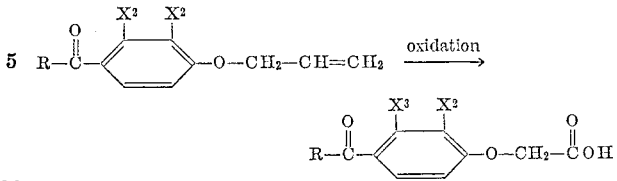

wherein the radical R represents a member selected from the group consisting of lower alkyl, e.g., propyl, 1-methylpropyl, 1-methylbutyl, isobutyl and trifluoromethyl substituted lower alkyl, e.g., 2,2,2-trifluoroethyl, 2,2,2-trifluoroisopropyl, etc.; $X^2$ and $X^3$ each represents similar or dissimilar radicals selected from the group consisting of hydrogen, halogen, e.g., chlorine, fluorine, etc., lower alkyl, e.g., methyl, ethyl, etc., lower alkoxy, e.g., methoxy, ethoxy, etc., trihalomethyl, e.g., trifluoromethyl, etc. and, taken together, the $X^2$ and $X^3$ radicals may be joined to form a 1,3-butadienylene linkage.

The examples which follow illustrate the method of preparing the (4-alkanoylphenoxy)acetic acids according to the process of the invention and disclose the method of preparing the (4-alkanoyl)allyloxybenzene compounds employed as the starting materials in the claimed synthesis. However, the examples are illustrative only and it will be apparent to one having ordinary skill that all of the products defined by Formula I, supra, may be prepared by substituting the appropriate starting materials for those employed in the examples.

Example 1.—(3-trifluoromethyl-4-butyrylphenoxy) acetic acid

Step A: 3-trifluoromethyl-4-bromophenyl allyl ether.— 3-trifluoromethyl-4-bromophenol (12.05 g., 0.05 mole) dissolved in methanol is added to a solution of 2.81 g. (0.05 mole) of potassium hydroxide in 35 ml. of an 85% methanol solution. The methanol is evaporated and the residue is dissolved in 50 ml. of glycol dimethyl ether (i.e., glyme). Allyl bromide (6.05 g., 0.05 mole) is added and the mixture is refluxed for 1½ hours. After removal of the potassium bromide, the solvent is evaporated and the residue distilled to obtain 10.5 g. of 3-trifluoromethyl-4-bromophenyl allyl ether, B.P. 78° C./1 mm.

Step B: 3-trifluoromethyl-4-(1-hydroxybutyl)phenyl allyl ether.—To a mixture of 2.60 g. (0.14 mole) of magnesium turnings in 150 ml. of ether there is added 20 g. (0.0712 mole) of 3-trifluoromethyl-4-bromophenyl allyl ether. The reaction is initiated and maintained by the slow addition of 12.4 g. (0.0712 mole) of ethylene bromide. After the magnesium has been consumed, 5.12 g. (0.0712 mole) of butyraldehyde is added and the mixture is refluxed for 1½ hours, cooled and added to a saturated ammonium chloride solution. The product is isolated by extraction with ethyl ether and the ether extract distilled to obtain 11.0 g. of an oil having a boiling point of 70–102° C./0.3 mm. The oil (7.92 g.) is placed on a 4 cm. column of 350 g. of alumina and eluted with benzene until the effluent contains no solute. The product is then eluted with a 2:1 mixture of benzene and ether and then with a 1:2 mixture of benzene and ether until the effluent contains no solute. The combined benzene-ether effluents are evaporated to obtain 5.5 g. of 3-trifluoromethyl-4-(1-hydroxybutyl)phenyl allyl ether ($n_D^{25}$ 1.4836).

Step C: 3 - trifluoromethyl - 4 - butyrylphenyl allyl ether.—3 - trifluoromethyl - 4 - (1 - hydroxybutyl)phenyl allyl ether (5.3 g., 0.093 mole) is dissolved in 30 ml. of acetone and the solution maintained at 0° C. while a solution of 3.86 g. (0.0396 mole) of chromium trioxide in a mixture of 10 ml. of water and 3.26 ml. of concentrated sulfuric acid is added slowly with stirring. After stirring for an additional two hours, cold water is added and the mixture is extracted with ether. After drying the extract thus obtained with sodium sulfate, the ether is evaporated and the residue distilled at 0.3 mm. to yield 4.9 g. of 3-trifluromethyl-4-butyrylphenyl allyl ether.

Step D: (3 - trifluoromethyl - 4 - butyrylphenoxy) acetic acid.—3 - trifluoromethyl - 4 - butyrylphenyl allyl ether (4.4 g., 0.018 mole) and 1.0 g. of sodium bicarbonate are added to 80 ml. of acetone and the mixture maintained at −10° C. while 8.54 g. (0.054 mole) of potassium permanganate is added slowly. The mixture is stirred for two hours, diluted with water and treated with sulfur dioxide until a colorless solution is obtained. The product is extracted with ether and the ether extract is in turn extracted with a 5% sodium bicarbonate solution. The extract thus obtained is chilled and acidified with 12 N hydrochloric acid and again extracted with ether. The ether extract is dried and evaporated and the residue crystallized from benzene to obtain 1.5 g. of (3-trifluoromethyl - 4 - butyrylphenoxy)acetic acid, M.P. 96–97° C.

Example 2.—(3-chloro-4-butyrylphenoxy)acetic acid

Step A: 3-chloro-4-bromophenyl allyl ether.—Potassium hydroxide (4.95 g., 0.0883 mole) is dissolved in 100 ml. of methanol and 18.27 g. (0.0883 mole) of 3-chloro-4-bromophenol is added. The solvent is then removed at 50° C. under reduced pressure. The red liquid residue is dissolved in 200 ml. of ethylene glycol dimethyl ether (i.e., glyme), 10.7 g. (0.0883 mole) of allyl bromide is added slowly and the mixture is refluxed for 16 hours. The potassium bromide formed is removed by filtration and the solvent is evaporated. The residue is taken up in ether and the solution is washed with a dilute 5% sodium hydroxide solution and with water until the washing is neutral. The ether solution is dried over magnesium sulfate and the ether is evaporated. The residue is distilled to obtain 13.87 g. of 3-chloro-4-bromophenyl allyl ether, B.P. 63–88° C./0.1 mm. The infrared spectrum of the compound is consistent for 3-chloro-4-bromophenyl allyl ether and gas phase chromatography shows it to be of 90% purity.

Step B: 3 - chloro - 4 - (1 - hydroxybutyl)phenyl allyl ether.—To 2.43 g. (0.1 mole) of magnesium turnings in 150 ml. of ether there is added 12.37 g. (0.05 mole) of 3-chloro-4-bromophenyl allyl ether. The reaction is initiated and maintained by the slow addition of 9.39 g. (0.05 mole) of ethylene bromide. After the magnesium has been consumed 3.61 g. (0.05 mole) of pure butyraldehyde is added slowly. An exothermic reaction ensues. The mixture is then refluxed for 1¼ hours, cooled and added to a saturated solution of ammonium chloride. The ether layer is separated, washed with water, dried over sodium sulfate and evaporated. The 11.6 g. of residue thus obtained is then distilled. The forerun, which has a boiling point of 50–87° C. at 0.2 mm. and which showed no hydroxyl peak in infrared examination, is discarded. The fraction boiling at 95–108° C. at 0.1 mm. is collected to obtain 3.58 g. of 3-chloro-4-(1-hydroxybutyl)phenyl allyl ether.

Step C: 3-chloro-4-butyrylphenyl allyl ether.—3-chloro-4-(1-hydroxybutyl)phenyl allyl ether (4.81 g., 0.02 mole) is dissolved in 20 ml. of acetone and to the solution 6.66 g. (0.066 mole) of chromium trioxide in 30 ml. of water and 5.6 ml. of concentrated sulfuric acid is added with stirring at −10° C. over a two-hour period. After stirring for an additional ½ hour the mixture is poured into water and the aqueous mixture extracted with ether. The ether extract is then washed with a 10% sodium bicarbonate solution and then with water and dried over magnesium sulfate. The ether is evaporated and the residue is distilled to obtain 4.45 g. of 3-chloro-4-butyryl-phenyl allyl ether, B.P. 120° C./0.2 mm., $n_D^{25}$ 1.5397.

Step D.: (3-chloro-4-butyrylphenoxy)acetic acid.—3-chloro-4-butyrylphenyl allyl ether (4.45 g., 0.019 mole) is dissolved in 30 ml. of acetone and 1.0 g. of sodium bicarbonate is added. Potassium permanganate (8.84 g., 0.056 mole) is then added at −10° C., with stirring, over a period of one hour. Stirring is continued for an additional ½ hour, water is added, and sulfur dioxide is bubbled into the mixture to dissolve the manganese dioxide which forms. The mixture is extracted with ether. The product is then extracted from the ether mixture with a dilute sodium hydroxide solution. Upon acidification of the basic extract, a solid separates which is crystallized from benzene to yield 1.5 g. of (3-chloro-4-butyrylphenoxy)acetic acid, M.P. 88–89° C.

By substituting the appropriate allyl halide and 4-halophenol reactants for the allyl bromide and 3-trifluoromethyl-4-bromophenol reactants of Example 1, Step A, and following substantially the procedure described in Steps A–D of that example, the products described in Table I are prepared. The equation which follows illustrates the process and Table I describes the products which are produced thereby.

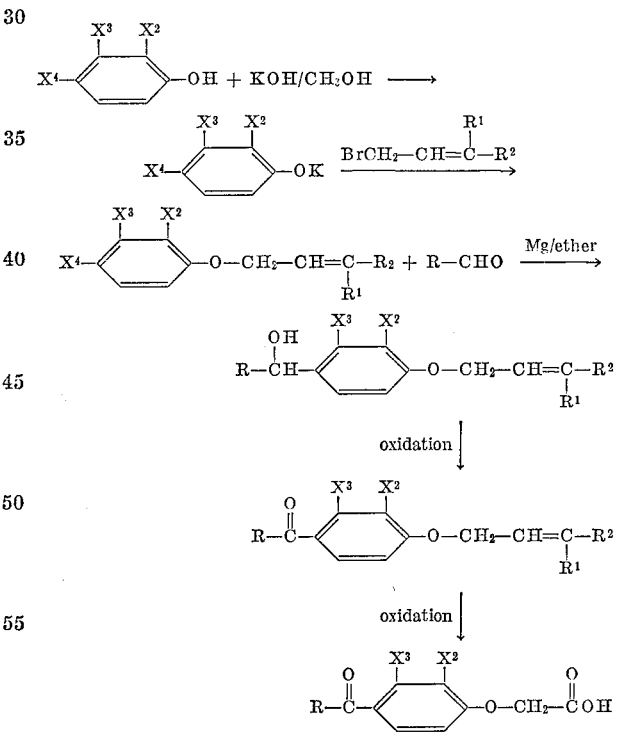

TABLE I

| Ex. | R | R¹ | R² | X² | X³ | X⁴ |
|---|---|---|---|---|---|---|
| 3 | —CH₂—CH₂—CH—CH₃ | H | H | H | Cl | Br |
| 4 | —CH₂—CH₂—CH₃ | H | H | H | H | Br |
| 5 | —CH₂—CH₂—CH₃ | —CH₃ | —CH₃ | H | —CH₃ | Br |
| 6 | —CH₂—CH₂—CH₃ | H | H | H | —C₂H₅ | Br |
| 7 | —CH₂—CH₂—CH₃ | H | H | H | —OCH₃ | Br |
| 8 | —CH₂—CH—CH₃<br>  \|<br>  CH₃ | —⟨ ⟩— | —⟨ ⟩— | H | Cl | Br |
| 9 | —CH₂—CH₂—CH₃ | H | H | —CH=CH—CH=CH— | | Br |

In addition to their utility as diuretics the products produced by the instant process are useful as chemical intermediates. Thus, the (4-alkanoylphenoxy)acetic acids react with formaldehyde or paraformaldehyde and the acid addition salt of a secondary amine as, for example, the acid addition salt of a di-lower alkylamine, piperidine or morpholine, to produce the corresponding acid addition salt of [4-(2-secondary - aminomethylalkanoyl)-phenoxy]acetic acid. The acid addition salt thus formed is then treated with a weak base, such as sodium bicarbonate, to obtain the corresponding [4-(2-methylenealkanoyl)phenoxy]acetic acid. Pharmacological studies show that the [4-(2-methylenealkanoyl)phenoxy]acetic acid derivatives also possess diuretic properties and are thus also useful in therapy for the treatment of conditions resulting from an excessively high retention of electrolyte or fluid within the body.

What is claimed is:

1. A process for preparing a compound of the formula:

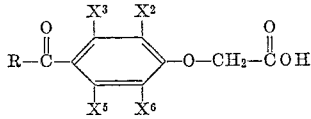

wherein R is a member selected from the group consisting of hydrogen, lower alkyl, halo-lower alkyl, cycloalkyl,

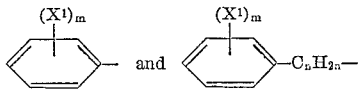

wherein $X^1$, in each occurrence, is a member selected from the group consisting of hydrogen, halogen, lower alkyl and lower alkoxy and $m$, in each occurrence, represents an integer having a value of 1–5 and $n$ represents an integer having a value of 1–4; $X^2$, $X^3$, $X^5$ and $X^6$ each represents similar or dissimilar radicals selected from the group consisting of hydrogen, halogen, lower alkyl, trihalomethyl, lower alkoxy and, taken together, two X radicals on adjacent carbon atoms of the benzene ring may be joined to form a 1,3-butadienylene linkage; which comprises the reaction of a compound of the formula:

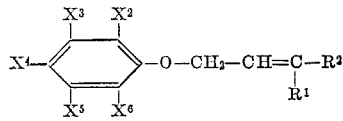

wherein the radicals $X^2$, $X^3$, $X^5$ and $X^6$ are as defined above, $R^1$ and $R^2$ each represents similar or dissimilar radicals selected from the group consisting of hydrogen, lower alkyl and aryl and $X^4$ represents halogen; with magnesium in ether, followed by the reaction of the Grignard reagent thus formed with an aldehyde of the formula: RCHO, wherein R is as defined above and oxidizing the 4-(1-hydroxyalkyl)phenyl allyl ether to the corresponding 4-alkanoylphenyl allyl ether by treatment with chromium trioxide or sodium chromate followed by the oxidation of the said ether to the desired product by treatment with potassium permanganate.

2. A process for preparing a compound of the formula:

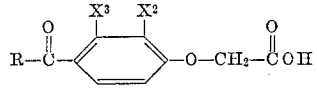

wherein R is a member selected from the group consisting of lower alkyl and trifluoromethyl substituted lower alkyl and $X^2$ and $X^3$ each represents similar or dissimilar radicals selected from the group consisting of hydrogen, halogen, lower alkyl, lower alkoxy, trihalomethyl and, taken together, the $X^2$ and $X^3$ radicals may be joined to form a 1,3-butadienylene linkage; which comprises the reaction of a compound of the formula:

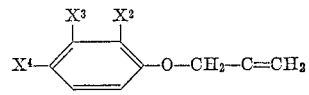

wherein the radicals $X^2$ and $X^3$ are as defined above and $X^4$ represents halogen; with magnesium in ether, followed by the reaction of the Grignard reagent thus formed with an aldehyde of the formula: RCHO, wherein R is as defined above and oxidizing the 4-(1-hydroxyalkyl)phenyl allyl ether to the corresponding 4-alkanoylphenyl allyl ether by treatment with chromium trioxide or sodium chromate followed by the oxidation of the said ether to the desired product by treatment with potassium permanganate.

3. A process for preparing (3-trifluoromethyl-4-butyrylphenoxy)acetic acid which comprises the reaction of 3-trifluoromethyl-4-bromophenyl allyl ether with magnesium in ether, followed by reaction of the Grignard reagent thus formed with butyraldehyde and oxidizing the 3-trifluoromethyl-4-(1 - hydroxybutyl)phenyl allyl ether thus produced to 3-trifluoromethyl-4-butyrylphenyl allyl ether which in turn is oxidized to the desired product by treatment with potassium permanganate.

4. A process for preparing (3-chloro-4-butyrylphenoxy)acetic acid which comprises the reaction of 3-chloro-4-bromophenyl allyl ether with magnesium in ether, followed by the reaction of the Grignard reagent thus formed with butyraldehyde and oxidizing the 3-chloro-4-(1-hydroxybutyl)phenyl allyl ether to 3-chloro-4-butyrylphenyl allyl ether by treatment with chromium trioxide which in turn is oxidized to the desired product by treatment with potassium permanganate.

References Cited

Wagner et al.: "Synthetic Organic Chemistry" (1963), QD262, W24, pp. 323–4, 159, 160, 420 and 421.

HENRY R. JILES, *Primary Examiner.*

S. B. WILLIAMS, *Assistant Examiner.*